US012785072B2

(12) United States Patent
Das Gupta et al.

(10) Patent No.: US 12,785,072 B2
(45) **Date of Patent: *Nov. 3, 2026**

(54) LITHIUM ION BATTERY ELECTRODE WITH UNIFORMLY DISPERSED ELECTRODE BINDER AND CONDUCTIVE ADDITIVE

(71) Applicant: ELECTROVAYA INC., Mississauga (CA)

(72) Inventors: Rajshekar Das Gupta, Toronto (CA); Elmira Memarzadeh, Mississauga (CA); Sankar Das Gupta, Mississauga (CA); Bjorn Haugseter, Skien (NO); Tom Henriksen, Skien (NO); Lars Ole Valøen, Porsgrunn (NO); Akhilesh Kumar Srivastava, Skien (NO)

(73) Assignee: ELECTROVAYA INC., Mississauga (CA)

(*) Notice: Subject to any disclaimer, the term of this patent is extended or adjusted under 35 U.S.C. 154(b) by 188 days.

This patent is subject to a terminal disclaimer.

(21) Appl. No.: 17/834,838

(22) Filed: Jun. 7, 2022

(65) Prior Publication Data

US 2022/0302438 A1 Sep. 22, 2022

Related U.S. Application Data

(63) Continuation of application No. 16/288,859, filed on Feb. 28, 2019, now Pat. No. 11,355,744, which is a (Continued)

(30) Foreign Application Priority Data

Oct. 28, 2010 (NO) .................................. 2010 1514

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0402* (2013.01); *H01M 4/0404* (2013.01);
(Continued)

(58) Field of Classification Search
CPC .. H01M 4/364; H01M 4/0402; H01M 4/0404; H01M 4/131; H01M 4/136;
(Continued)

(56) References Cited

U.S. PATENT DOCUMENTS 5,491,037 A 2/1996 Kawakami
2005/0034299 A1 2/2005 Kurihara et al.
(Continued)

FOREIGN PATENT DOCUMENTS

CN 1691375 A 11/2005
CN 108183236 A * 6/2018
(Continued)

OTHER PUBLICATIONS

IPRP for related PCT/IB2001/054738, completed Apr. 3, 2013.
ISR for related PCT/IB2001/054738, mailed Feb. 24, 2012.

*Primary Examiner* — Jonathan G Jelsma
(74) *Attorney, Agent, or Firm* — Haynes and Boone, LLP

(57) ABSTRACT

The present disclosure relates generally to an electrode produced with a non-toxic solvent, resulting in a homogeneous mixture with uniform distributions of a conductive additive and a binder. Electrodes produced according to the present disclosure feature narrow binder particle size distribution, which distinguishes such electrodes from typical electrodes produced via a N-Methyl-Pyrrolidone (NMP) process. The resulting microstructure promotes the flow of current through the electrode and has an improved cycling stability due, in part, to the binder's and the conductive additive's ability to bind with the active material particles used in the fabrication of the electrode.

15 Claims, 14 Drawing Sheets

Related U.S. Application Data continuation-in-part of application No. 16/183,519, filed on Nov. 7, 2018, now abandoned, which is a continuation of application No. 15/138,797, filed on Apr. 26, 2016, now Pat. No. 10,153,482, which is a continuation of application No. 13/882,501, filed as application No. PCT/IB2011/054738 on Oct. 24, 2011, now Pat. No. 9,324,998.

(51) Int. Cl.

| | |
|---|---|
| ***H01M 4/131*** | (2010.01) |
| ***H01M 4/136*** | (2010.01) |
| ***H01M 4/139*** | (2010.01) |
| ***H01M 4/1391*** | (2010.01) |
| ***H01M 4/13915*** | (2010.01) |
| ***H01M 4/485*** | (2010.01) |
| ***H01M 4/505*** | (2010.01) |
| ***H01M 4/525*** | (2010.01) |
| ***H01M 4/58*** | (2010.01) |
| ***H01M 4/62*** | (2006.01) |
| ***H01M 10/0525*** | (2010.01) |
| ***H01M 10/058*** | (2010.01) |

(52) U.S. Cl.

CPC ....... *H01M 4/0435* (2013.01); *H01M 4/0471* (2013.01); *H01M 4/131* (2013.01); *H01M 4/136* (2013.01); *H01M 4/139* (2013.01); *H01M 4/1391* (2013.01); *H01M 4/13915* (2013.01); *H01M 4/485* (2013.01); *H01M 4/505* (2013.01); *H01M 4/525* (2013.01); *H01M 4/5825* (2013.01); *H01M 4/62* (2013.01); *H01M 4/621* (2013.01); *H01M 4/623* (2013.01); *H01M 10/0525* (2013.01); *H01M 10/058* (2013.01); *Y02E 60/10* (2013.01); *Y02P 70/50* (2015.11); *Y10T 29/49115* (2015.01)

(58) Field of Classification Search

CPC ............... H01M 4/139; H01M 4/1391; H01M 4/13915; H01M 4/485; H01M 4/505; H01M 4/525; H01M 4/5825; H01M 4/62; H01M 4/621; H01M 4/623; H01M 10/058

See application file for complete search history.

(56) References Cited

U.S. PATENT DOCUMENTS

| | | | | |
|---|---|---|---|---|
| 2005/0191550 | A1 | 9/2005 | Satoh et al. | |
| 2005/0260498 | A1* | 11/2005 | Saidi | H01M 4/133 429/231.95 |
| 2005/0271797 | A1 | 12/2005 | Na et al. | |
| 2007/0087267 | A1 | 4/2007 | Kim et al. | |
| 2009/0267028 | A1* | 10/2009 | Hoshiba | H01M 4/139 252/500 |
| 2010/0167129 | A1 | 7/2010 | Wu et al. | |
| 2011/0076557 | A1 | 3/2011 | Ishii et al. | |
| 2011/0143198 | A1* | 6/2011 | Choi | H01M 10/052 252/182.1 |

FOREIGN PATENT DOCUMENTS

| | | | | |
|---|---|---|---|---|
| DE | 19952335 | | 5/2001 | |
| DE | 10352063 | | 6/2005 | |
| JP | H07105940 | | 4/1995 | |
| JP | 9167614 | | 6/1997 | |
| JP | H11250892 | | 9/1999 | |
| JP | 2000150320 | | 5/2000 | |
| JP | 2005353570 | | 12/2005 | |
| JP | 2010064022 | | 3/2010 | |
| TW | 201342698 | A * | 10/2013 | H01M 4/13 |

* cited by examiner

Electron Image 1

F Ka1_2

C Ka1_2

Mn Ka1

Ni Ka1

O Ka1

LITHIUM ION BATTERY ELECTRODE WITH UNIFORMLY DISPERSED ELECTRODE BINDER AND CONDUCTIVE ADDITIVE

CROSS-REFERENCE TO RELATED APPLICATIONS

This application is a continuation of U.S. patent application Ser. No. 16/288,859, filed Feb. 28, 2019, now U.S. Pat. No. 11,355,744, which is a continuation-in-part of U.S. patent application Ser. No. 16/183,519, filed Nov. 7, 2018, which is a continuation of U.S. patent application Ser. No. 15/138,797, filed Apr. 26, 2016, now U.S. Pat. No. 10,153,482, which is a continuation of U.S. patent application Ser. No. 13/882,501, filed Apr. 29, 2013, now U.S. Pat. No. 9,324,998, which is a national stage entry of International Patent Application No. PCT/IB2011/054738, filed on Oct. 24, 2011, which claims priority from Norwegian Patent Application No. 2010 1514, filed on Oct. 28, 2010, the disclosures of each of which are incorporated herein by reference in their entireties.

TECHNICAL FIELD

The available invention regarding a process for manufacturing of a slurry for production of a battery film, more specific deal with the available invention process for generating a slurry for application of anode and cathode materials in batteries, a process for manufacturing of cathodes and anodes for lithium batteries and a process for manufacturing of a lithium battery cell.

BACKGROUND TECHNIQUE

A lithium battery is made from three main components: anode, cathode and electrolyte.

Anode and cathode normally consist of metal foils which are covered by a thin layer of a powder mixture, active materials, which are bound together by a binder. The binders function is to glue the powder particles together and glue these firmly to the metal foil. The binder must be flexible and chemically stable towards the electrolyte.

A typical anode consist of a copper foil which is covered by a thin layer (40-100 microns) with graffiti powder, carbon, which is tied together by means of the plastic material PVDF (polyvinylidene fluoride).

A typical cathode consist of an aluminum foil which is coated by a thin layer (40-100 microns) of lithium metal oxide which is bound together by the plastic material PVDF.

A typical electrolyte is a mixture of a lithium salt such as lithium hexafluorophosphate ($LiPF_6$), lithium tetrafluorophosphate ($LiPF_4$), lithium hexafluoroarsenate ($LiAsF_6$), lithium perchlorate ($LiClO_4$), Lithium tetrafluoroborate ($LiBF_4$), and lithium triflate ($LiCF_3SO_3$) and organic carbonates, for instance EC (ethylene carbonate), DEC (diethyl carbonate) and DMC(dimethyl carbonate).

The most common manufacturing process for making a battery film for lithium ion batteries is to blend active materials and PVDF, and mix this into a solvent dissolving the PVDF. The purpose to dissolve the binder is to disperse the material evenly between the particles in the powder mixture in order to secure a good binding between these. This mixture is then applied to the metal foil by means of extrusion, rolling or tape-casting depending on selected process and amount of solvents used. After application the foil will be dried by evaporation of solvents.

The most common solvent in order to dissolve PVDF is NMP (N- Methyl-Pyrrolidone), which is both a toxic and environmentally harmful chemical. There are a variety of alternative solvents, but most of them have in common that they are either toxic, liable to catch fire or unfavorable relating to the chemical structure of the finished battery. Consequently, it is important that the solvent is fully removed from the battery film during production and that the evaporation of NMP is controlled with regards to the environmental requirements. The process of removing the last remnants of the solvent (down to ppm level) from the battery film is a demanding process which is both energy- and space demanding and make substantial demands from the technical equipment.

There are waterborne manufacturing processes in which the powder is mixed with water to form a paste or thin slurry. The disadvantage of using water is the relatively energy demanding process to evaporate the water so that the dried battery film must be completely free from water so that the battery shall operate.

From US 2005/0271797 A1 it is known that a production process for a lithium battery consisting of the steps of a) prepare an EC (ethylene carbonate) solution by loosening EC-crystals in a suitable solvent, (b) then dissolve a binder in a suitable solvent in order to make a binder solution and then add and mix sufficiently an active electrode material and an electric conductive material of a wanted composition into the binder solution, (c) add a defined amount of the EC mixture prepared in step (a) into the binder solution from step (b), blend the mixture of EC solution and the binder solution sufficiently so that the slurry in form of an electrode binder can be coated onto an electrode, (e) coat a collector with the slurry, (f) dry the paste layer at a given temperature, and complete the electrode production by pressing a dried electrode structure at a given pressure after the slurry has dried. The process described in US 2005/0271797 A1 also comprises mixing a solvent together with an ethylene carbonate plus insert a second solvent to a binder solution together with an active material for then subsequently to add a given amount of the solvent mixed with ethylene carbonate to the mixture of the binder solution with the other solvent. Thus the process comprises the application of at least one solvent for generating the slurry.

There is a need for providing a manufacturing process of slurry for electrode materials for lithium batteries which is not burdened with the problems associated with use of solvents indicated above.

From PCT No. PCT/IB2011/054738 it is known that there is a manufacturing process of slurry for electrode materials for lithium ion batteries which is not burdened with the problems associated with the use of solvents indicated above.

Lithium-ion batteries or cells include one or more positive electrodes, one or more negative electrodes, and an electrolyte. Anodes and cathodes normally consist of a composite with agglomerated primary particles of active compounds and inactive materials which are coated and calendared onto copper and aluminum current collectors, respectively. The binders act as a glue between the powder particles and between the powder particles and the metal foil current collector. The binder should be flexible and chemically stable towards the electrolyte.

It has been demonstrated that uniform distribution of PVDF binder contributes to an electrochemical property enhancement of the electrode by placing the electrode particles closer together. A better binder distribution can lead to smaller interfacial impedance and better electric contact between active material particles. The disconnection often leads to degradation of the electrode. Due to extremely poor electrical conductivity of all cathode active materials in a lithium-ion or lithium metal cell, a conductive additive typically in the amount of 2%-15%, should be added into the electrode. The conductive carbon materials which have good conductivity and electrochemical stability are used as a conductive agent in lithium ion battery, especially nano-conductive carbon additives, such as acetylene black (AB), Ketjen black (KB), Super P (SP), short carbon fibers, and carbon nanotubes.

However, it is difficult to make these kinds of nano-conductive carbon particles disperse homogeneously into the slurry because they have a tendency to flocculate due to their large surface area, especially when the particles must be dispersed in highly dense suspensions of active materials. If the conductive particulates are dispersed heterogeneously in the cathode, not only might the performances of the battery deteriorate, but also production speed, yield and battery safety could be affected.

When manufacturing a battery film for lithium ion batteries using NMP, as discussed above, the electrode microstructure exhibits significant inhomogeneity because the initially dissolved binder starts precipitating inside the electrode once the solvent NMP is being vaporized and removed from only the top of the electrode. The solvent flows to the top via a capillary force with varying solvent/binder concentrations in the electrode. Therefore, the binder tends to move to the surface of the electrodes and precipitates wherever supersaturation takes place (at nucleating sites). Because of the inhomogeneity within the electrode, the electrode thickness is kept relatively thin per side of the current collector (i.e., typically between approximately 40-60 microns). Further, as discussed above, NMP solvents are a toxic and environmentally harmful chemical.

Therefore, there is a need for a thicker electrode that does not involve the use of toxic solvents, with a binder and a conductive additive that are well dispersed to reduce internal resistance and enhance electrochemical performance through a higher energy density and a more homogeneous microstructure.

SUMMARY OF THE INVENTION

There is a purpose with the present invention to provide a method for manufacturing of slurry for application onto cathode and anode materials in batteries, a method for manufacturing of cathodes and anodes for lithium batteries plus a method for manufacturing of a lithium ion battery cell, where the above mentioned problems are solved.

More exactly, the present invention is stating a method for manufacturing of slurry for coating of electrodes for use in lithium ion batteries. The method comprises as a minimum the steps of a) Mix active materials with a binder into a binder solution, and
b) Add an organic carbonate to a binder solution so that a slurry is generated According to one aspect of the invention, the mixing process is executed according to the steps a and b at a temperature above the melting temperature of the binder.

According to another aspect of the invention the active materials are adapted to one anode and one cathode respectively.

In accordance with yet another aspect of the invention is the active cathode material collected from the group of: $LiCoO_2$, $LiFePO_4$, $LiMn_2O_4$, $LiNiO_2$, $Li_2FePO_4F$, $LiCo_{1/3}Ni_{1/3}iMn_{1/3}O_2$,$Li(Li_\alpha Ni_x Mn_y Co_z)$ and the active anode material is collected from the group of: $LiC_6$, $Li_4Ti_5O_{12}$,$Si(Li_{4,4}Si)$ og Ge ($Li_{4,4}Ge$).

In accordance with an additional aspect of the invention the binder is a polyvinyl fluoride and the organic carbonate is collected from the group: ethylene carbonate, dimethyl carbonate or diethyl carbonate.

An additional aspect of the invention comprises the method's further process at least in the steps of:

a) Mix active materials with a binder into a binder solution,
b) Add an organic carbonate to the binder solution such that a slurry is generated
c) Coat an electrode material with the slurry
d) Evaporate/dry the coating on the electrode material by drying/evaporation of the organic carbonate, and
c) Surface treatment of the slurry so that the electrode is prepared for use in a lithium battery cell. The process is also characterized by the fact that step d further may comprise a parallel step of recovery 4 where gases from the organic carbonate is collected for re-use. The collected organic carbonate can be condensed, filtered and cleaned before being used again.

In another implementation step e comprises one or more sub-steps of:

i) Roll the electrode material
ii) Bake the electrode material, and
iii) Finalize the electrode material for use in a lithium battery cell In accordance with another aspect of the available invention, the active materials are adjusted for one anode and one cathode respectively, and the active cathode material may be collected from the group of: $LiCoO_2$, $LiFePO_4$, $LiMn_2O_4$, $LiNiO_2$, $Li_2FePO_4F$, $LiCo_{1/3}Ni_{1/3}MnmO_2$, $Li(Li_a Ni_x Mn_y Co_z)$ and the active anode material collected from the group of: $LiC_6$, $Li_4Ti_5O_{12}$, $Si(Li_{4,4}Si)$ or $Ge(Li_{4,4}Ge)$.

In accordance with an aspect from the available invention, then the binder is a polyvinylidene fluoride.

The organic carbonate can be collected from the group: ethylene carbonate, diethyl carbonate or dimethyl carbonate.

In another aspect according to the available invention then a method for generating a lithium battery cell is provided, where the method at least comprises of the steps of:

Make a slurry for coating of electrodes for use in lithium ion batteries, where the slurry comprises active materials, binder and an additional diluting agent (thinner), where the diluting agent consists of a component in an electrolyte material for a manufactured lithium battery cell, a) Coating of an anode material and a cathode material with the slurry,
b) Evaporate/dry the coating on the anode- and cathode material by steaming/drying of the organic carbonate, and
c) Surface treatment of the slurry so that the electrode is made ready for use in a lithium ion battery cell.
d) Arrange one or several cathodes and anodes in layers with lithium permeable membranes lying between
e) Arrange cathodes, anodes and the permeable membranes in a house with one or more openings, and
f) Fill the house with an electrolyte, where the electrolyte includes salts and diluents with lithium content Further aspects and characteristics of the available invention are brought forward by the belonging independent patent claims.

When manufacturing a battery film for lithium ion batteries using NMP, as discussed above, the electrode microstructure exhibits significant inhomogeneity because the initially dissolved binder starts precipitating inside the electrode once the solvent NMP is being vaporized and removed from only the top of the electrode. The solvent flows to the top via a capillary force with varying solvent/binder concentrations in the electrode. Therefore, the binder tends to move to the surface of the electrodes and precipitates wherever supersaturation takes place (at nucleating sites). Because of the inhomogeneity within the electrode, the electrode thickness per side of the current collector is kept relatively thin (i.e., typically between approximately 40-60 microns). Further, as discussed above, NMP solvents are a toxic and environmentally harmful chemical.

According to one aspect of the present disclosure a positive electrode for a secondary battery comprises a current collector having at least one lateral surface coated with an electrode slurry. The electrode slurry comprises an active material; dispersed particles of conductive additive; and dispersed particles of a binder. The active material may be a positive active material. The conductive additive may comprise carbon. The binder may be polyvinylidene fluoride (PVDF). The dispersed particles of each of the conductive additive and the binder may be substantially uniformly dispersed.

According to certain aspects of the present disclosure, the coating on the at least one lateral surface of the positive electrode may have a thickness of between 50 and 500 microns, or between 100 and 300 microns, or approximately 150 microns. The current collector may comprise a second lateral surface, wherein the second lateral surface may be coated with the electrode slurry. The coating on the second lateral surface of the positive electrode may have a thickness of between 50 and 500 microns, such that the combined thickness of the coatings on the at least one and the second lateral surfaces is between 100 and 1000 microns. In certain embodiments, the combined thickness of the coatings on the at least one and the second lateral surfaces may be between 200 and 600 microns, or approximately 300 microns.

According to certain aspects of the present disclosure, the dispersed particles of polyvinylidene fluoride binder may comprise 1 to 10, or 2 to 5, or approximately 3 percent by weight of the positive electrode.

According to certain aspects of the present disclosure, the dispersed particles of conductive additive comprise 1 to 10, or 3 to 5, or approximately 4 percent by weight of the positive electrode.

According to certain aspects of the present disclosure, the fluoride signal from the binder may ranges from a ratio of 2 to 5 through the entire thickness of the electrode.

According to certain aspects of the present disclosure, the average particle size of the dispersed particles of polyvinylidene fluoride binder may be between 150 and 450 nm, or between 200 and 300 nm, or approximately 250 nm.

According to certain aspects of the present disclosure, there may be an average distance of 500 nm, 300 nm, or 200 nm or less between adjacent dispersed particles of conductive additive. Similarly, there may be an average distance of 500 nm, 300 nm, or 200 nm or less between adjacent dispersed particles of PVDF binder.

According to certain aspects of the present disclosure, the active material may comprise lithium, manganese, nickel, cobalt, aluminum, or a combination thereof. The active material may be selected from a group consisting of: $LiCoO_2$, $LiFePO_4$, $LiMn_2O_4$, $LiNiO_2$, $Li_2FePO_4F$, $LiCo_{1/3}Ni_{1/3}Mn_{1/3}O_2$, and $Li(Li_aNi_xMn_yCo_z)$. As noted, the active material may be a positive active material.

According to certain aspects of the present disclosure, in areas where the active materials are, there may be a 5:6 ratio in intensity of carbon and manganese signals when analyzed using Energy Dispersive X-Ray Spectroscopy (EDS).

According to certain aspects of the present disclosure, the conductive additive may be selected from the group consisting of carbon black, acetylene black, and graphite, or combinations thereof.

According to certain aspects of the present disclosure, the positive active material may be adhered strongly to the current collector.

Additional features and advantages of the present disclosure will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

SHORT DESCRIPTION OF THE DRAWINGS

The following is a brief description of the figures in the accompanying drawings. The figures are not necessarily to scale, and certain features and certain views of the figures may be shown exaggerated in scale or in schematic in interest of clarity or conciseness.

The available invention will be more easy to understand with support of the belonging figures, where FIG. 1. shows a principle drawing for manufacturing of slurry for battery electrodes according to the available invention.

Figure 3A:
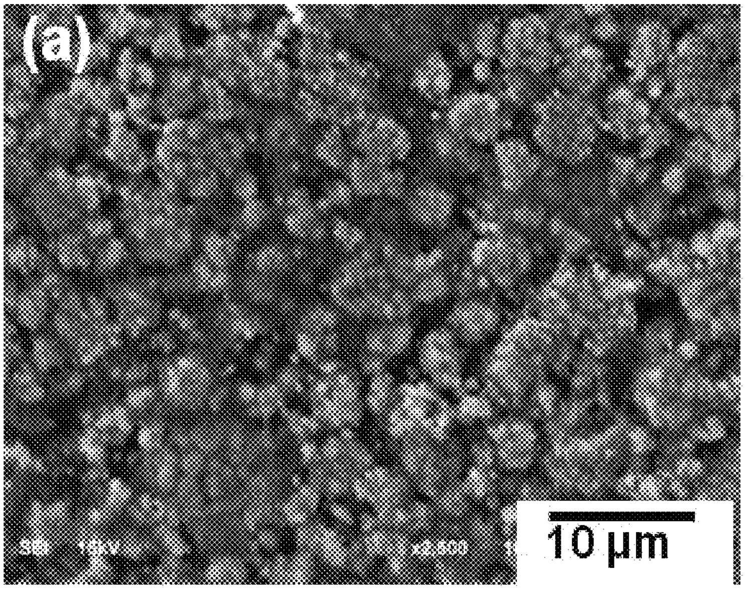
FIGS. 3A and 3B show Scanning Electron Microscopy (SEM) images of a top surface of a cathode according to the present disclosure.
Figure 3B:
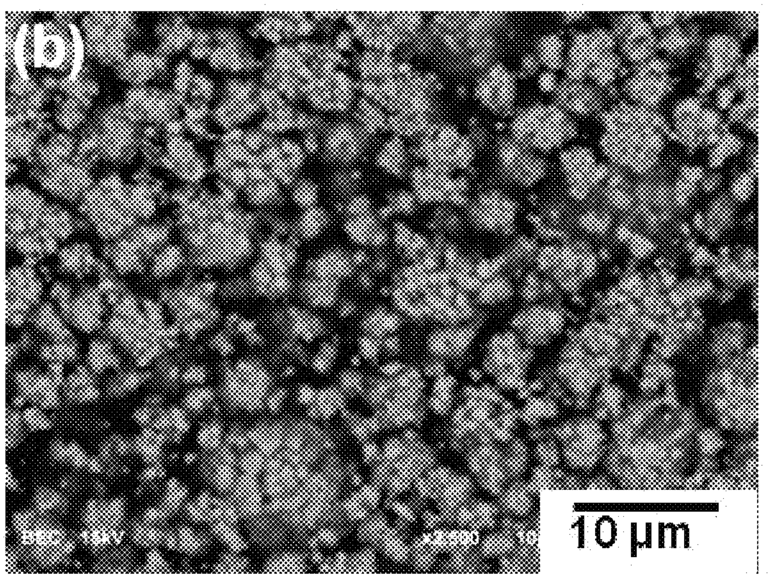
Figure 3C:
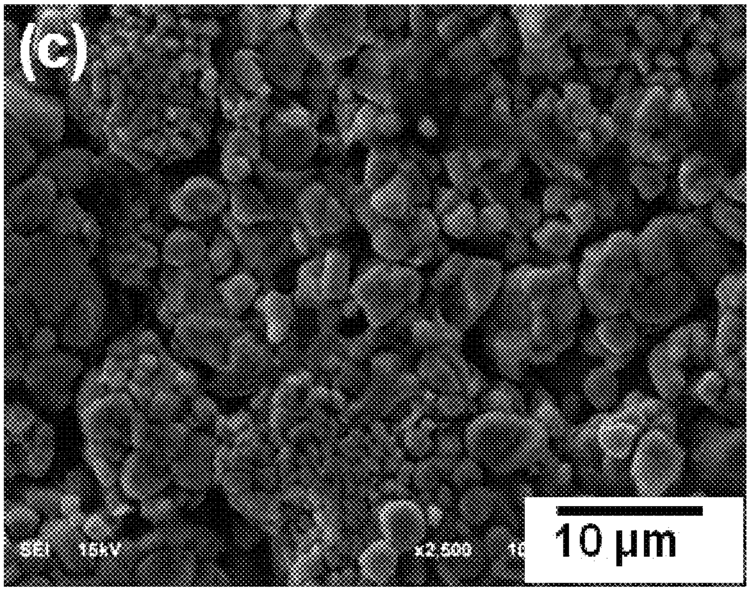
FIG. 3C PRIOR ART
FIGS. 3C and 3D show SEM images of a top surface of a cathode produced by a typical NMP process.
Figure 3D:
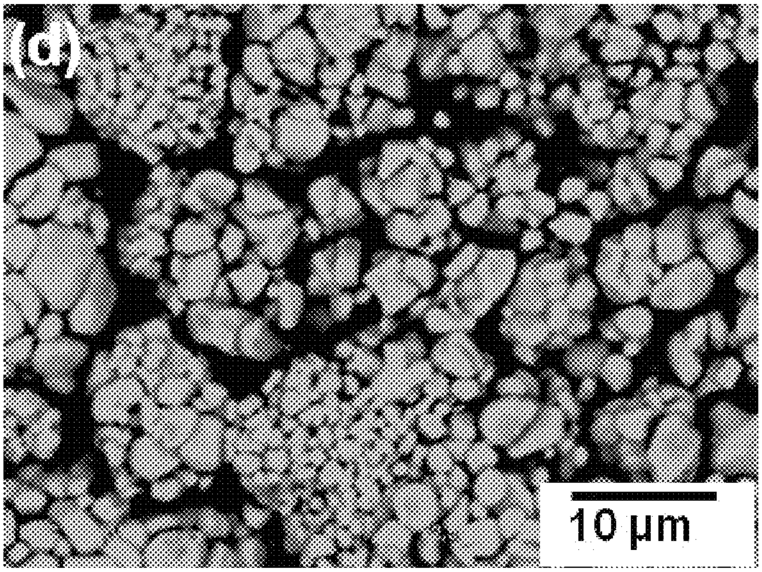
FIG. 3D PRIOR ART
Figure 3E:
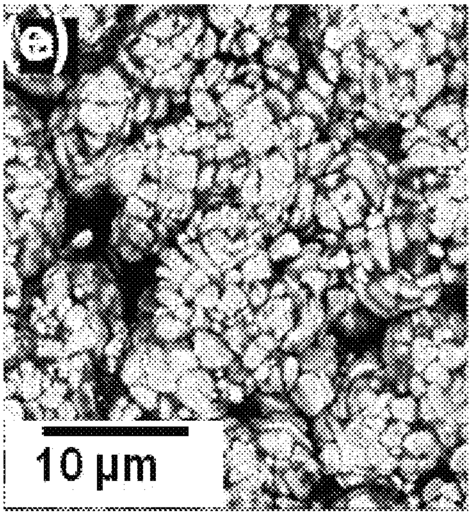
FIG. 3E PRIOR ART

FIG. 3E shows an SEM image of a top surface of an NMC electrode produced using NMP (J. Xia et al., J. Electrochem. Soc., 2014, 161 (4), A547-A553).

Figure 4A:
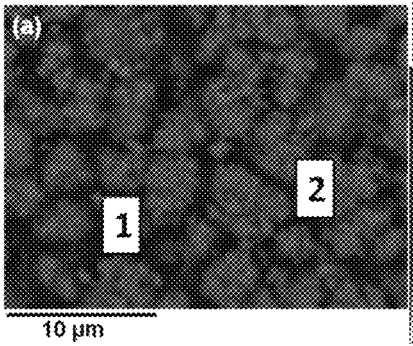

FIG. 4A shows a Scanning Electron Microscopy (SEM) micrograph of an area of a cathode prepared according to the present disclosure.

Figure 4B:
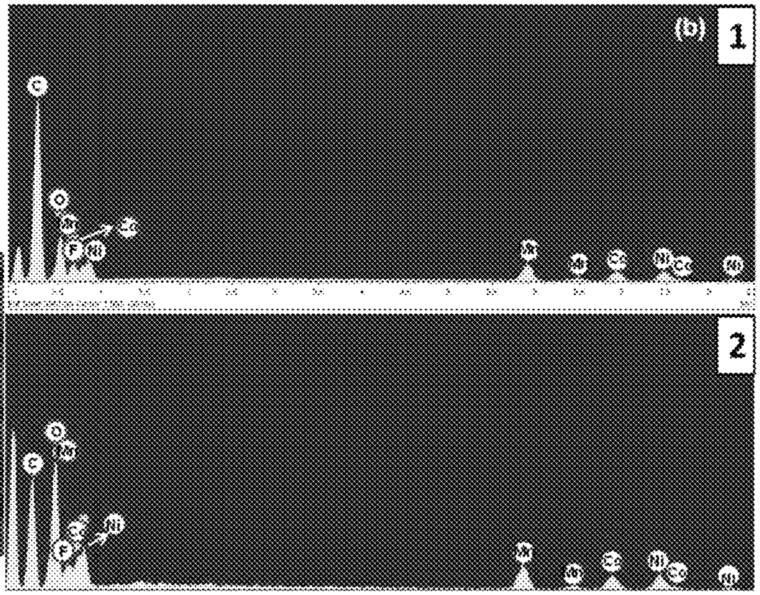

FIG. 4B shows Energy Dispersive X-Ray Spectroscopy (EDS) results corresponding to the areas 1 and 2 of FIG. 4A of a cathode according to the present disclosure.

Figure 4C:
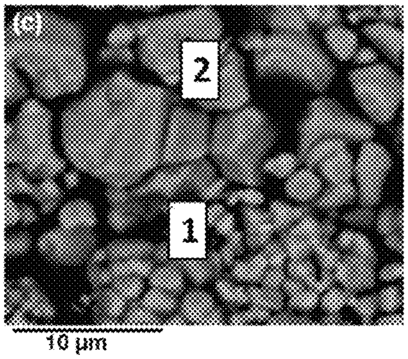
FIG. 4C PRIOR ART

FIG. 4C shows a Scanning Electron Microscopy (SEM) micrograph of an area of a cathode produced by a typical NMP process.

Figure 4D:
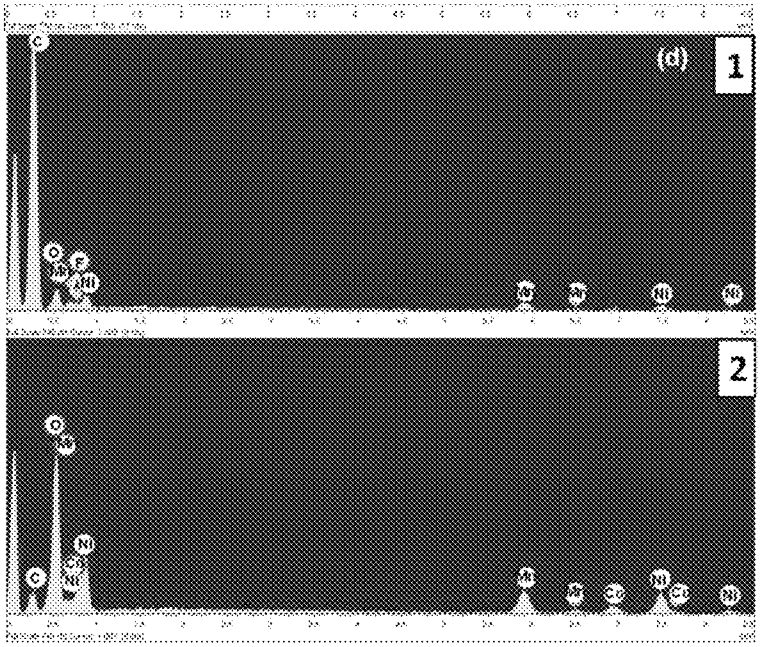
FIG. 4D PRIOR ART

FIG. 4D shows Energy Dispersive X-Ray Spectroscopy (EDS) results corresponding to the areas 1 and 2 of FIG. 4C of a cathode produced by a typical NMP process.

Figure 5A:
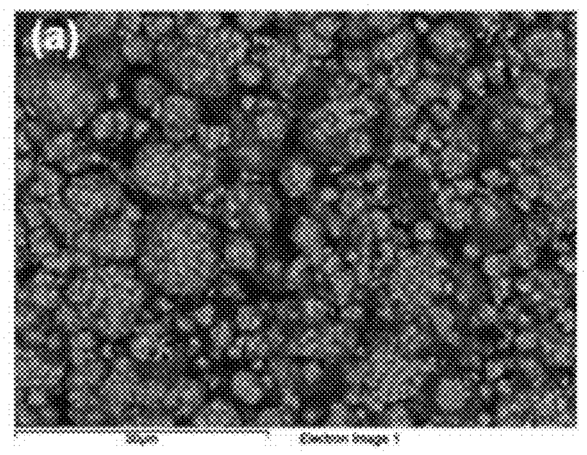

FIG. 5A shows a SEM micrograph of an area of a cathode according to the present disclosure.

FIGS. 5B, 5C, 5D, 5E, and 5F show, respectively, Fluorine, Carbon, Manganese, Nickel, and Oxygen elemental maps from EDS analysis of a cathode according to the present disclosure over the area shown in FIG. 5A.

Figure 5D:
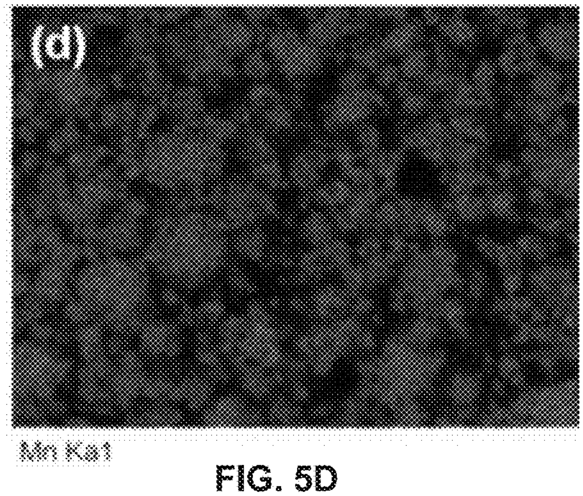
Figure 5B:
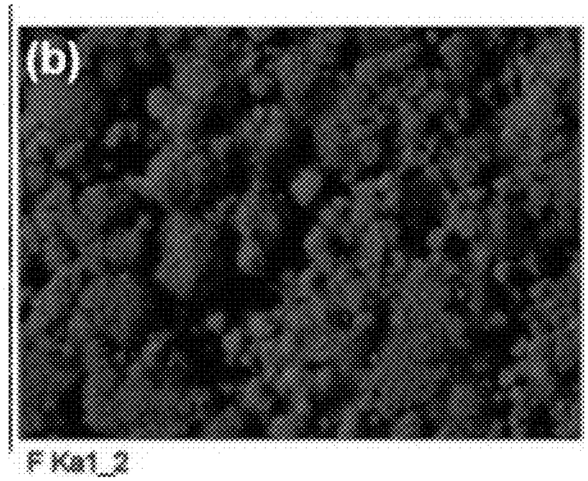
Figure 5E:
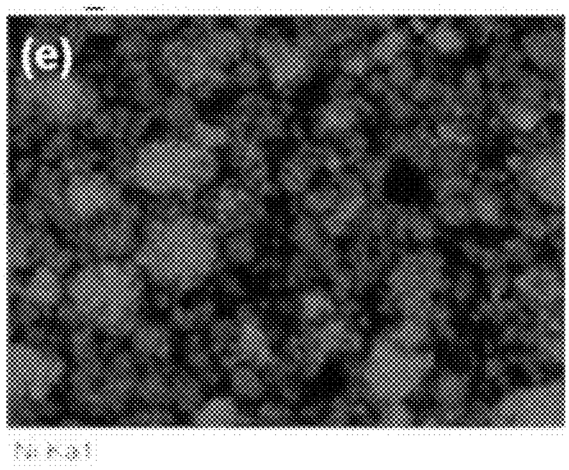
Figure 5C:
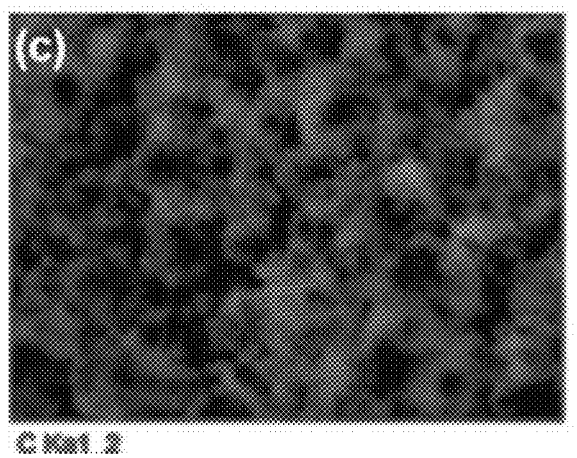
Figure 5F:
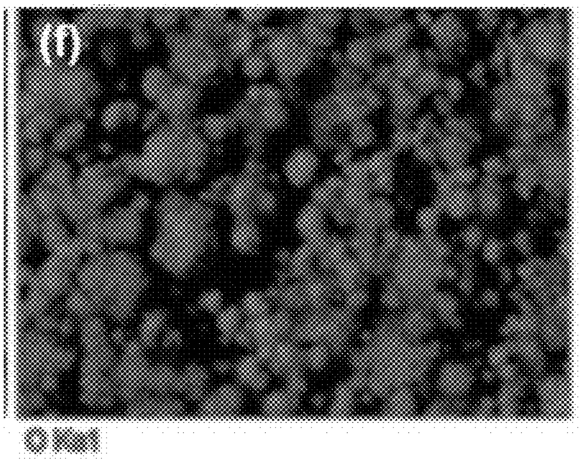
Figure 5G:
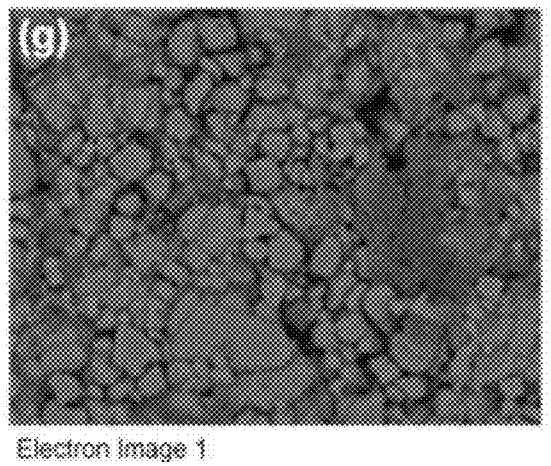
FIG. 5G PRIOR ART
Figure 5H:
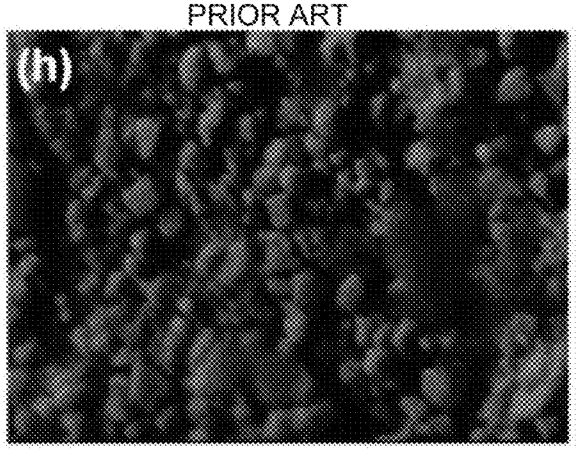
FIG. 5H PRIOR ART
Figure 5I:
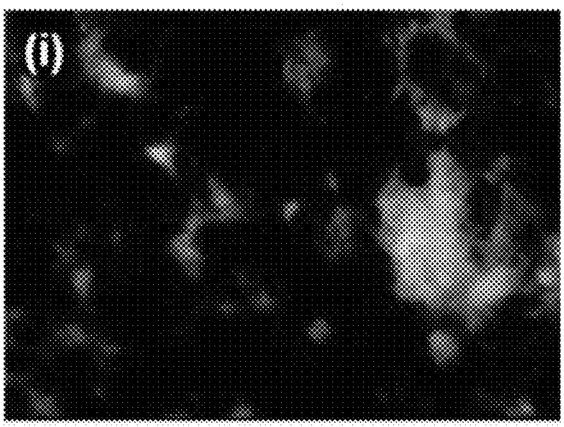
FIG. 5I PRIOR ART
Figure 5J:
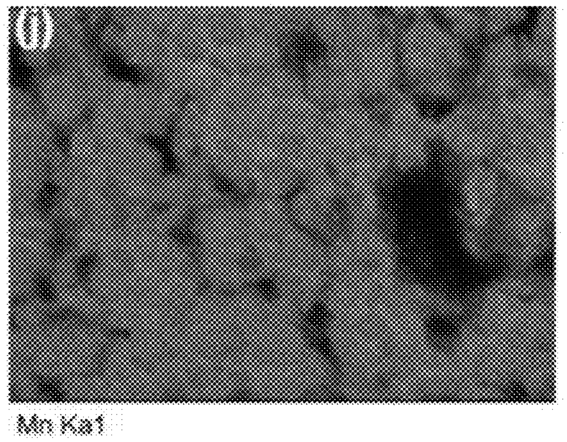
FIG. 5J PRIOR ART
Figure 5K:
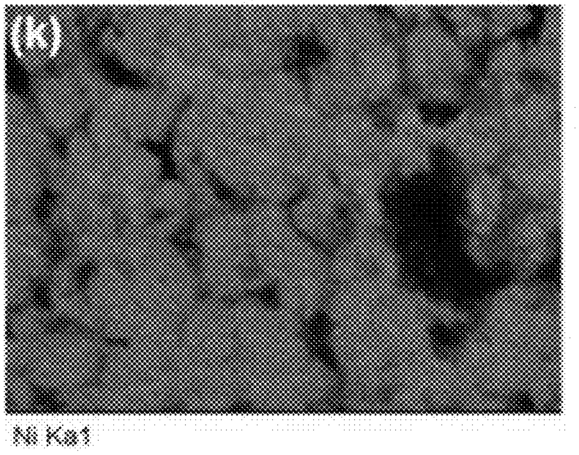
FIG. 5K PRIOR ART
Figure 5L:
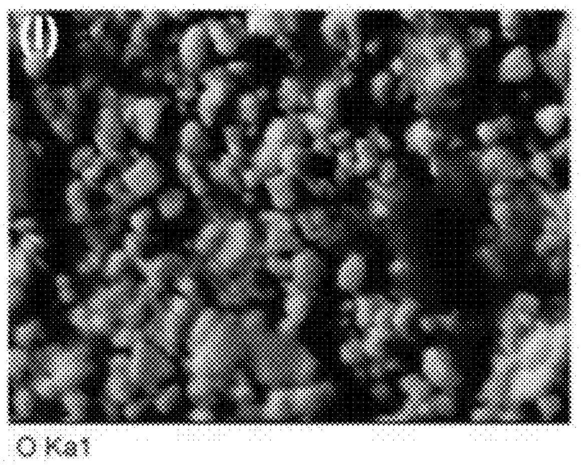
FIG. 5L PRIOR ART

FIG. 5G shows a SEM micrograph of an area of a cathode produced by a typical NMP process.

FIGS. 5H, 5I, 5J, 5K and 5L show, respectively, Fluorine, Carbon, Manganese, Nickel, and Oxygen elemental maps from EDS analysis of a cathode produced by a typical NMP process over the area shown in FIG. 5G.

Figure 6A:
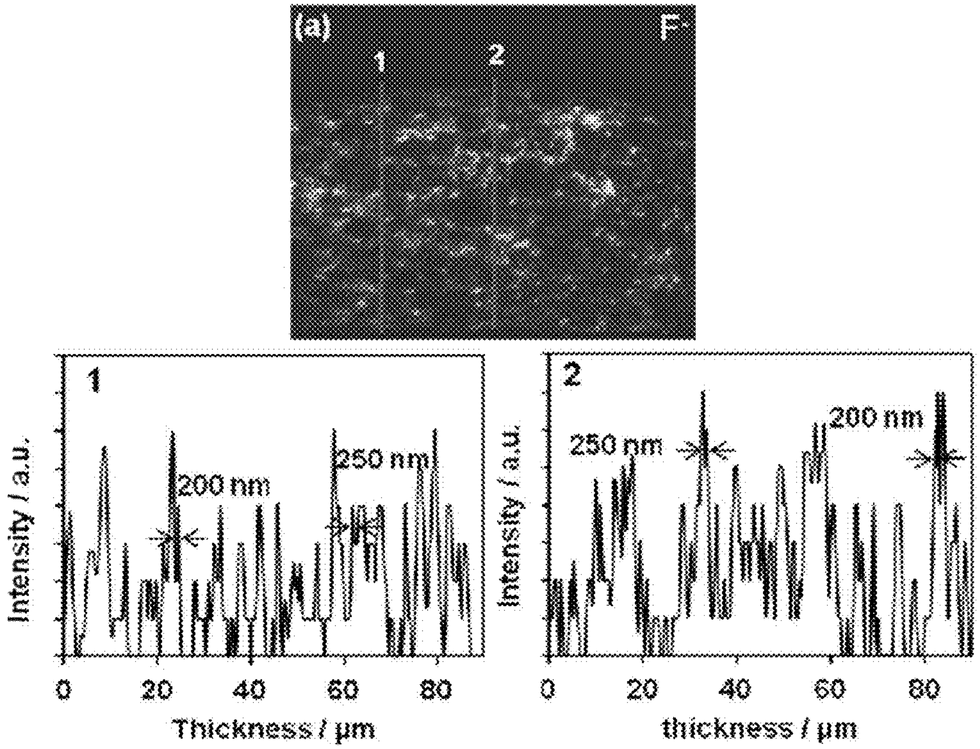
Figure 6B:
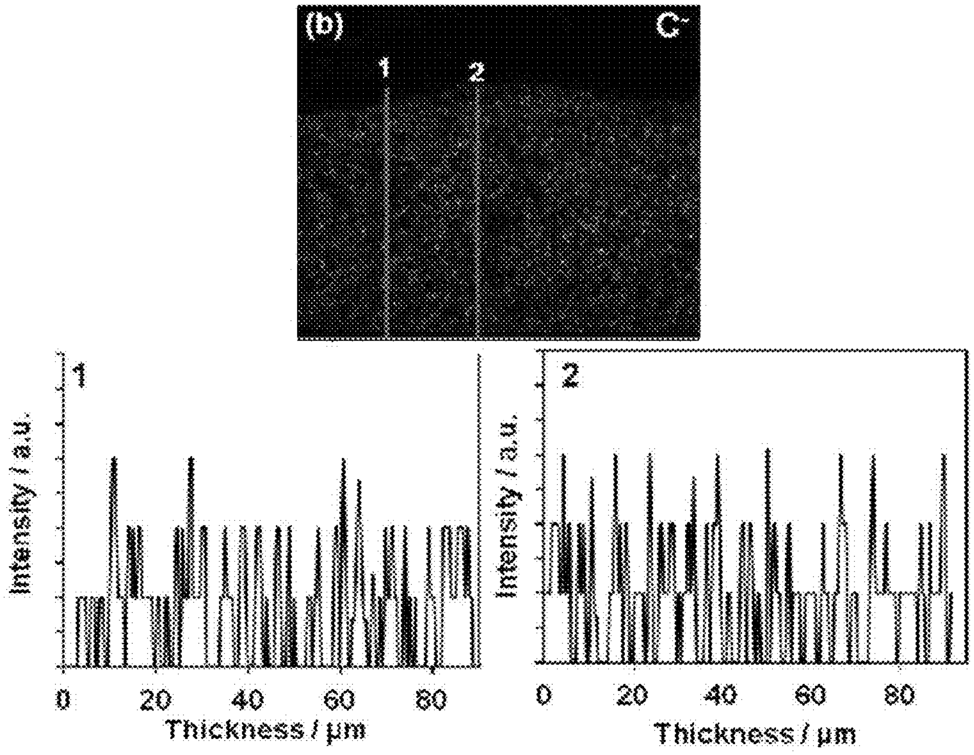

FIGS. 6A and 6B show TOF-SIMS (Time of Flight Secondary Ion Mass Spectrometry) signals of F- and C- of a cathode according to the present disclosure.

Figure 6C:
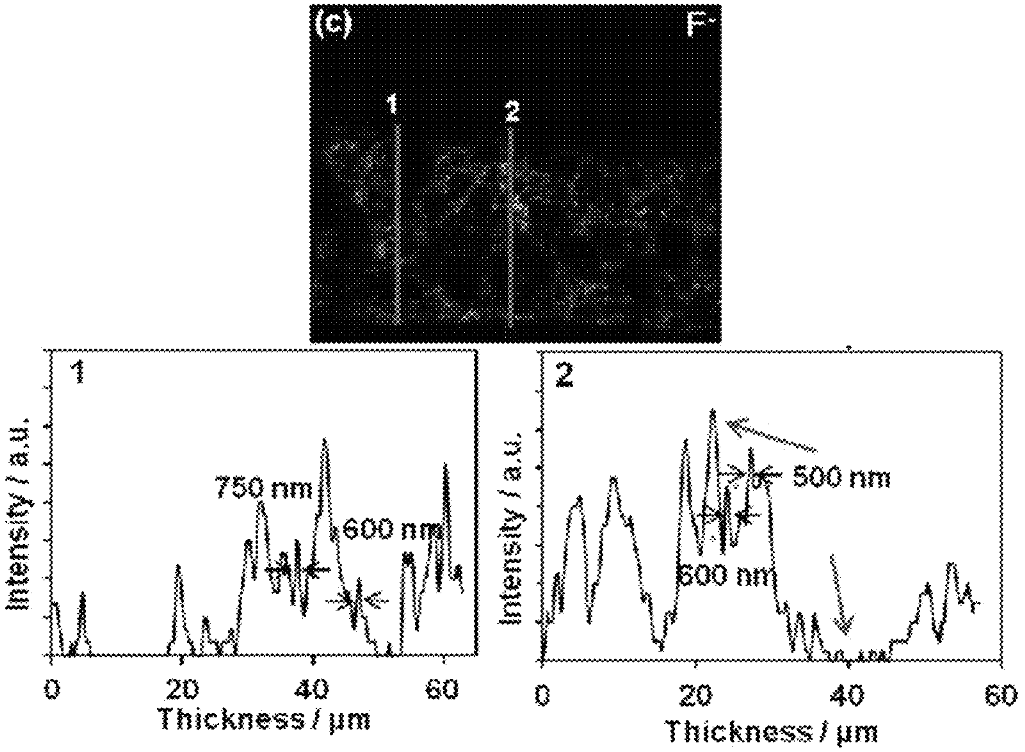
FIG. 6C PRIOR ART
Figure 6D:
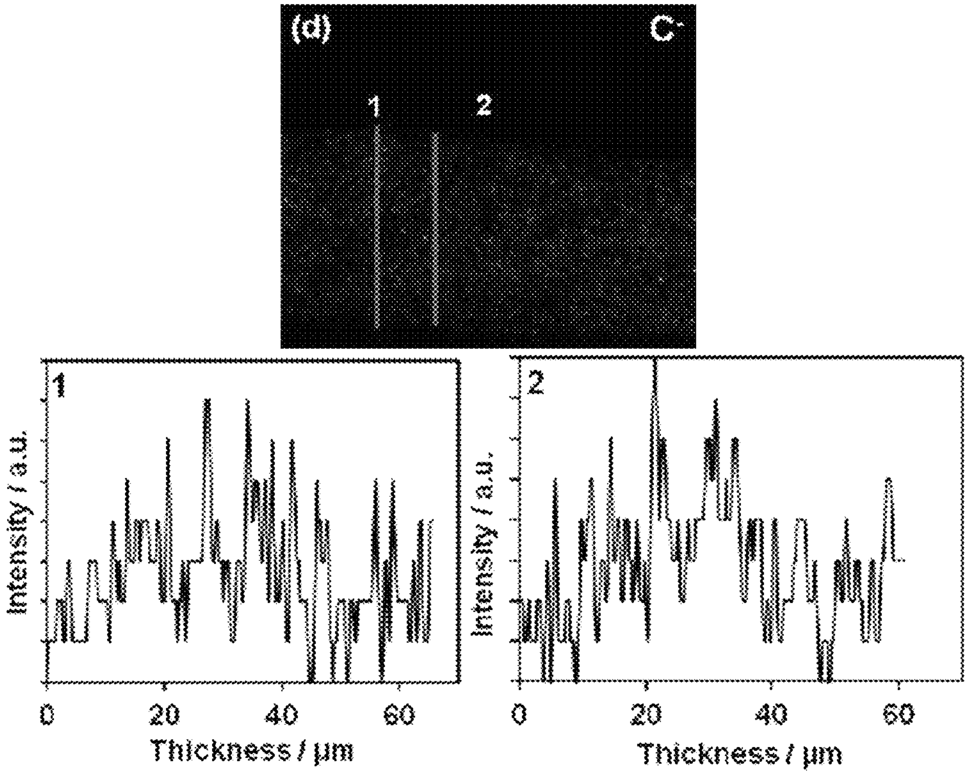
FIG. 6D PRIOR ART

FIGS. 6C and 6D show TOF-SIMS signals of F- and C- of a typical cathode produced using NMP.

Figure 6E:
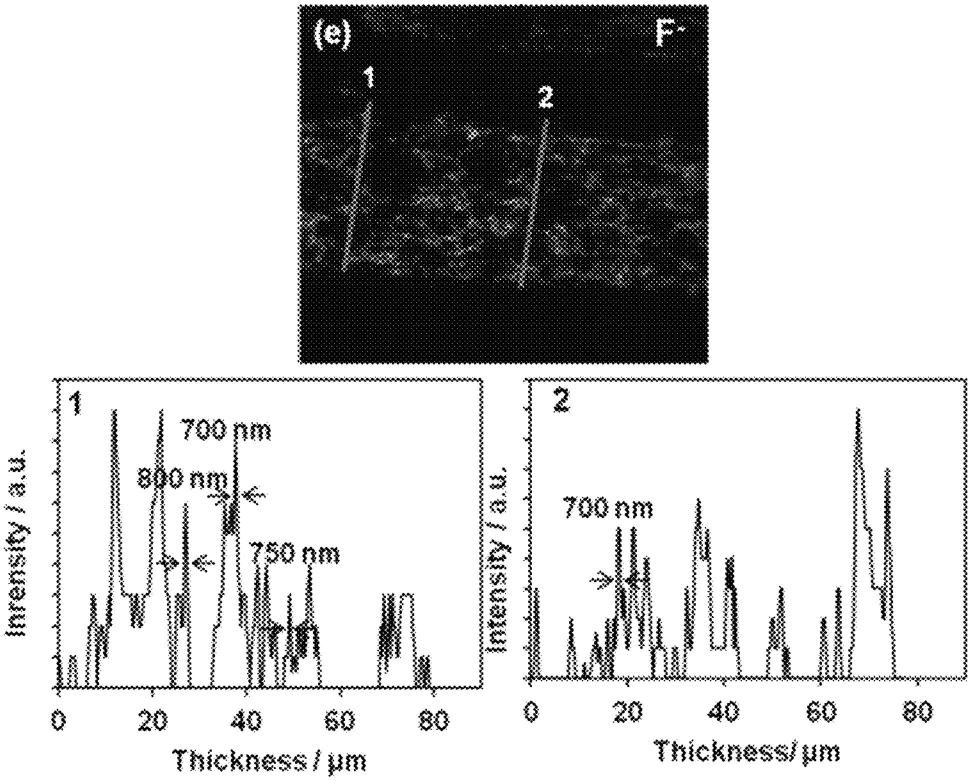
FIG. 6E PRIOR ART
Figure 6F:
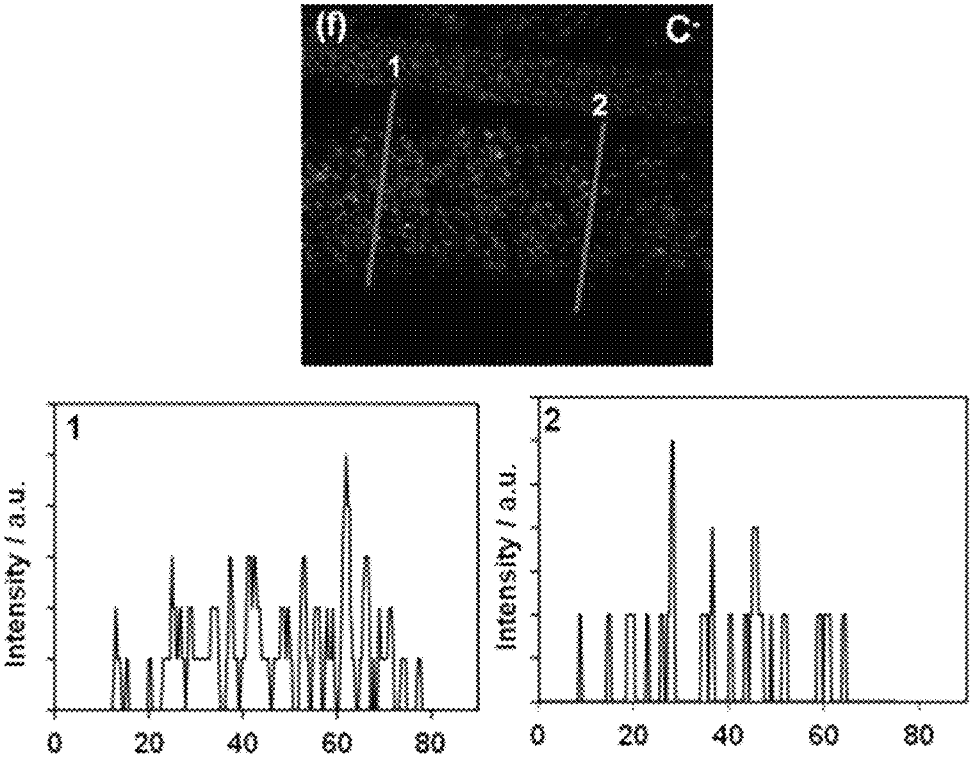
FIG. 6F PRIOR ART

FIGS. 6E and 6F show TOF-SIMS signals of F- and C- of a typical supplier cathode.

Figure 6G:
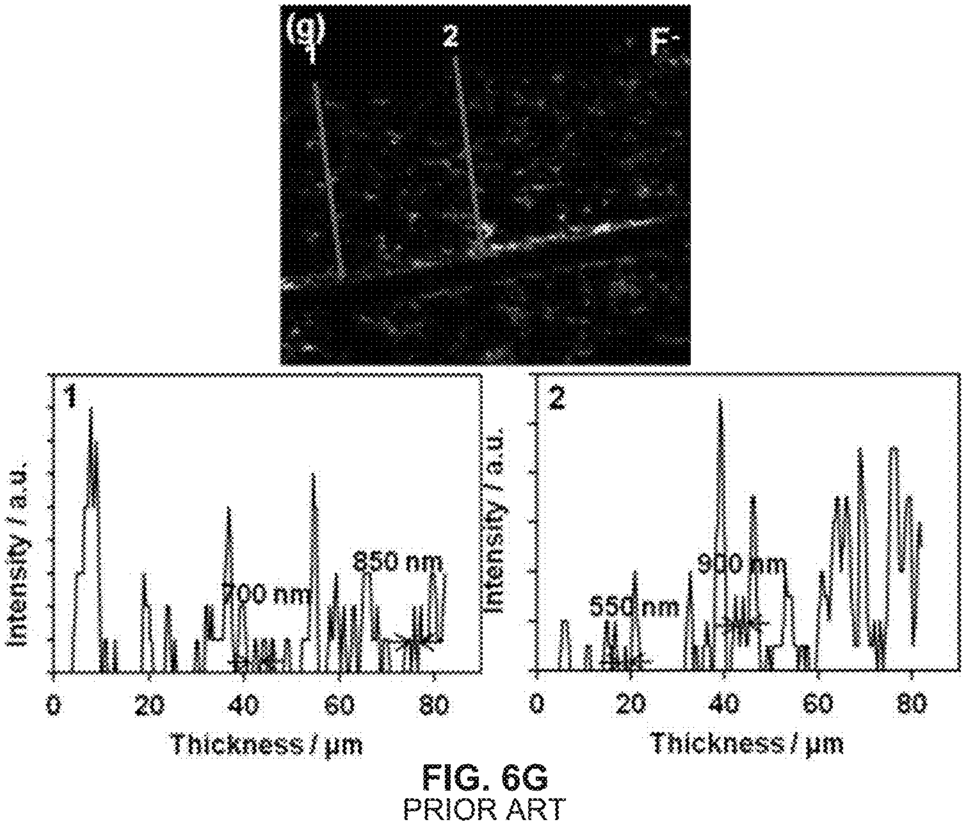
FIG. 6G PRIOR ART
Figure 6H:
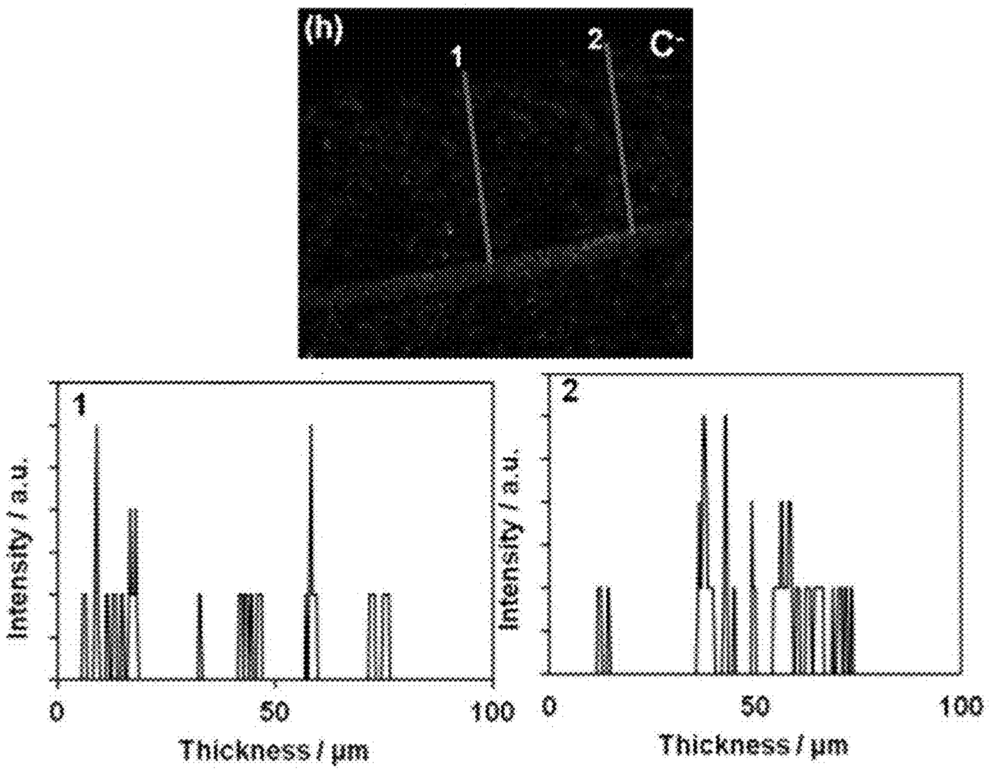
FIG. 6H PRIOR ART

FIGS. 6G and 6H show TOF-SIMS signals of F- and C- of a typical supplier anode.

Figure 7A:
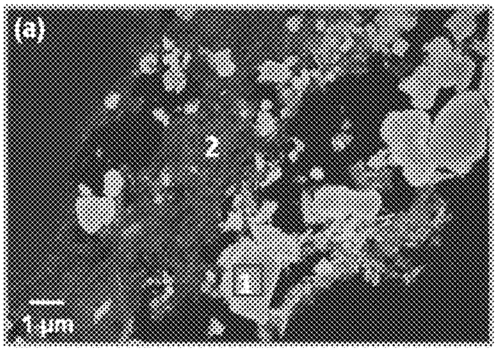

FIG. 7A shows a HAADF STEM (High Angle Annular Dark Field-Scanning Transmission Electron Microscopy) image of a cathode according to the present disclosure.

Figure 7B:
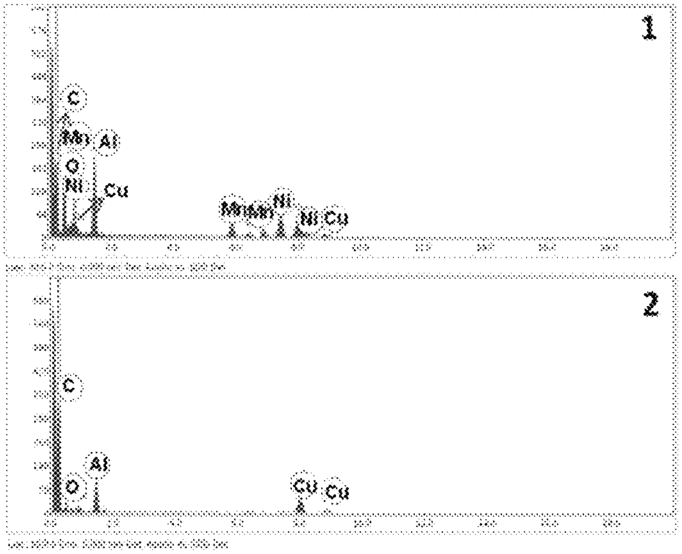

FIG. 7B shows Energy Dispersive X-Ray Spectroscopy (EDS) results corresponding to the areas 1 and 2 of FIG. 7A of a cathode according to the present disclosure.

Figure 7C:
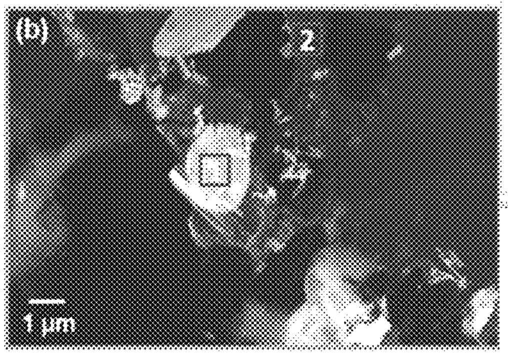
FIG. 7C PRIOR ART

FIG. 7C shows a HAADF STEM image of a typical cathode produced using a typical NMP process.

Figure 7D:
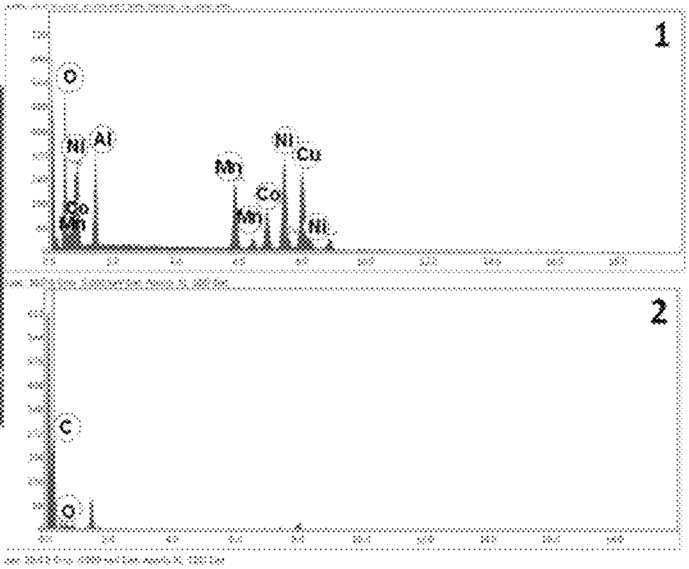
FIG. 7D PRIOR ART

FIG. 7D shows Energy Dispersive X-Ray Spectroscopy (EDS) results corresponding to the areas 1 and 2 of FIG. 7C of a cathode produced by a typical NMP process.

Figure 8A:
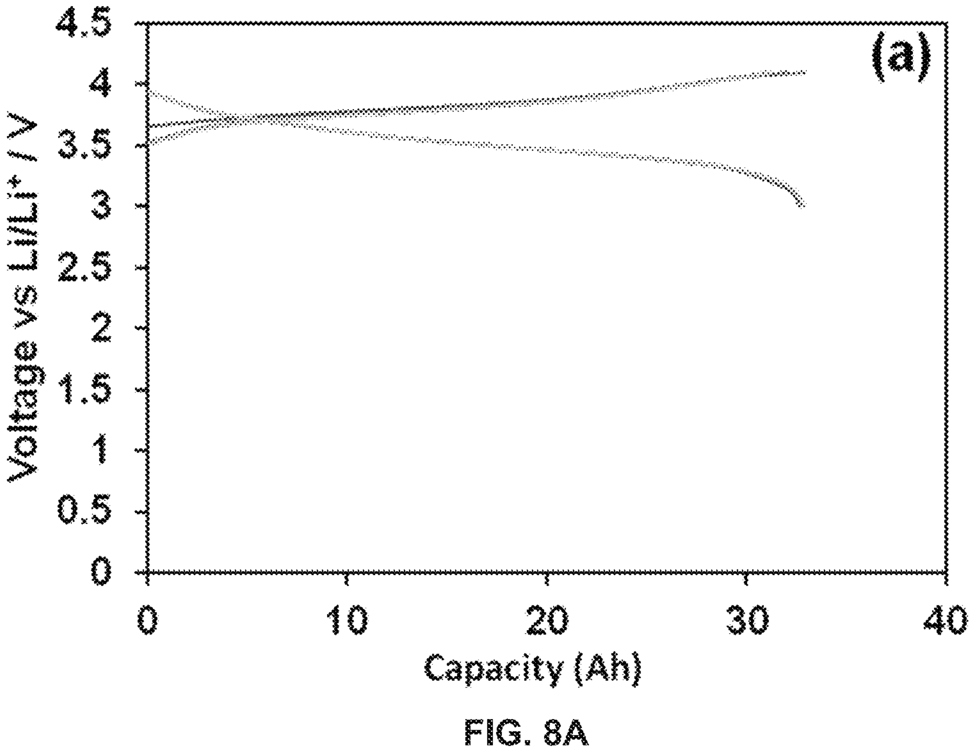

FIG. 8A shows a voltage profile for the first 10 cycles of a cathode according to the present disclosure.

Figure 8B:
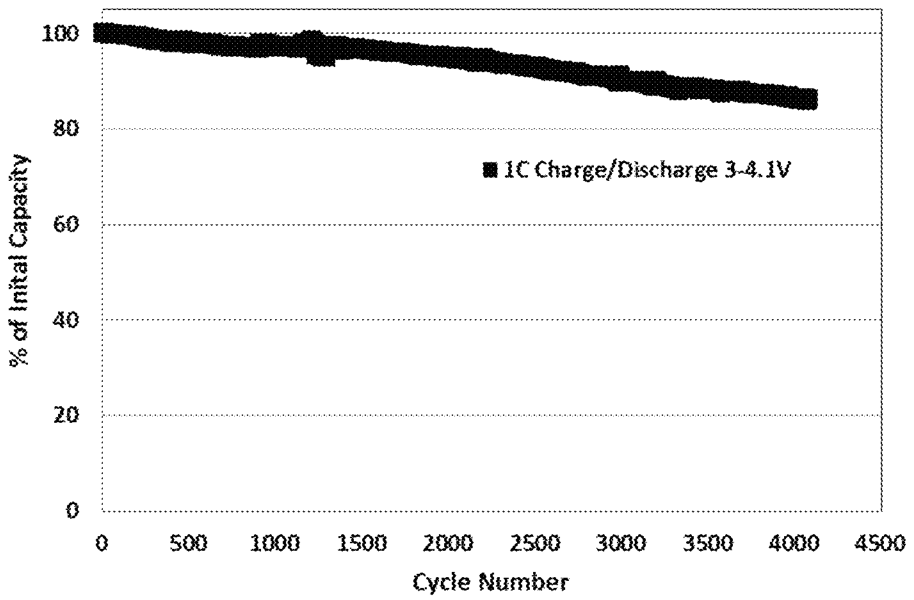

FIG. 8B shows a cycle life of a cathode according to the preset disclosure coupled with a graphite anode in a full cell.

The foregoing summary, as well as the following detailed description of certain inventive techniques, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION OF THE INVENTION

In the following detailed description, numerous specific details may be set forth in order to provide a thorough understanding of embodiments of the present invention. However, it will be clear to one skilled in the art when embodiments of the present invention may be practiced without some or all of these specific details. In other instances, well-known features or processes may not be described in detail so as not to unnecessarily obscure the invention. In addition, like or identical reference numerals may be used to identify common or similar elements.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In the following text, the available invention will be described with support from the belonging figure It shall be understood that according to the invention, the foil that normally is used as cathodes and anodes also may comprise materials similar to fabrics or more generally, any conductive conductor which is compatible with the methods according to the available invention.

First, there will be a description of a general implementation of the invention, followed by examples of the methods that will be shown.

As indicated introductorily there exists a desire to change the process of manufacturing the slurry for coating of battery electrodes for lithium batteries.

Lithium ion batteries normally consist of three active elements, namely anode, cathode plus an electrolyte. As indicated above, it is the purpose of the available invention to find an alternative to the disadvantageous use of solvents for coating of the electrode foils.

The slurry that is applied to the electrode foils must have the correct body and viscosity so that the active layer that is applied to the electrodes will have a correct dry film thickness and homogeneity.

In order to be able to form a paste or thinly liquid slurry from binder, such as PVDF and powder in the form of active materials, the mixture has to be added a liquid. By using a liquid which is entered as a component in the finished battery it is not necessary that the liquid is removed completely. This component will still be added at a later stage in the process. According to the execution of the available invention, a method for manufacturing of the slurry for coating of battery electrodes is provided, where the slurry, meaning active components and a binder will be diluted with a diluting agent, where the diluting agent is a component of the electrolyte which shall be used in the same lithium battery In general the process for manufacturing of slurry according to the available patent can be described with support from FIG. 1. Active materials A which will be constituent parts in the final slurry, will be mixed with a binder B in a first homogenization step 1.in order to obtain correct viscosity and consistency of the slurry a solvent C is added. It is in accordance with the available invention that the solvent C represents a component of the final lithium ion battery cell.

After the homogenization step the slurry has obtained the desired body/viscosity and the electrode material D can be coated 2 with the slurry. The coating process may be in the form of extruding, rolling or tape casting, or other suitable coating processes known from the industry.

Step 3 in the process comprises evaporation of the thinner which was added to the homogenization process 1. The applied slurry will consequently change from being viscous slurry to become a more solid material.

In parallel with step 3 there may be an active recycling step 4 which recycles the thinner that evaporates.

The following step 5 that is the step following step 3 and 4 is a step where the electrode material with the applied coating is rolled.

The following step 6 comprises baking of the rolled electrode, this baking will among other things secure that the binder adheres sufficiently to the active electrode materials and to the electrode foil.

The final step 7 comprises further finishing of the lithium ion batteries.

It shall be understood that manufacturing according to the steps 1 to 7 may be run consecutively and continuously, so that when step 1 is finished and a batch from step 1 moves onto step 2, then new materials can be added a homogenization of step 1, same is valid for the following steps, so that a manufacturing process can run continuously.

Implementation According to the Available Invention

In the following the available invention will be described with an example.

In this example in accordance with the available invention, the materials that will be used in the manufacturing of a lithium ion battery cell will comprise the following.

The anode, that is the positive electrode, consists of a copper foil; this copper foil shall be coated with an active material, generally in the form of a graffiti powder ($LiC_6$). Also other active materials such as titanat ($Li_4Ti_5O_{12}$), $Si(Li_{4,4}Si)$ or $Ge(Li_{4,4}Ge)$ can be used as active anode material. The graffiti powder shall be applied to the copper foil, in order for such a coating process to be successful and give a homogeneous surface then the graffiti powder must be mixed with 1 PVDF, PVDF and the graffiti powder must consequently be given a viscosity which is suitable for coating and thus the mixture will be added an organic carbonate, such as ethylene carbonate (EC) C. This blending step corresponds to the homogenization step 1 according to the general process description. The mixture may be heated to a temperature above the melting point of the thinner, i.e. the ingredient that was blended in order to give the right viscosity. The temperature may well be above the melting point of the thinner and close to the transition temperature of the binder.

The cathode, i.e. the negative electrode consists of an aluminum foil this aluminum foil shall be coated by an active material in the form of a lithium metal oxide. The lithium metal oxide shall be coated on the copper foil, so that such a coating process shall be successful and give a homogeneous surface then the lithium metal oxide A must be mixed with 1 PVDF, PVDF and lithium metal oxide must consequently be given a viscosity suitable for coating therefore the mixture will be added ethylene carbonate (EC) C. This step of the mixing corresponds with the homogenization step 1 according to the general process description The following steps for cathode and anode follow roughly the same process as described in FIG. 1.

Another Performance Specification According to the Available Invention

In the following the available invention will be described with another example.

In this example in accordance with the performance specification of the available invention the material used during the manufacturing of a lithium ion battery cell comprises the following.

The anode, that is the positive electrode consists of a copper foil, this copper foil shall typically be coated by an active material in the form of a graffiti powder, thus the process for the anode is according to the description above.

The cathode that is the negative electrode consists of an aluminum foil this aluminum foil shall be coated by an active material in the form of a metal oxide such like one of Lithium cobalt oxide ($LiCoO_2$), a polyanion such like Lithium iron phosphate ($LiFePO_4$) or a lithium manganese oxide ($LiMn_2O_4$). Further cathode materials are found in the not supplementary group, $LiNiO_2$, $Li_2FePO_4F$, $LiCo_{1/3}N_{1/3}M_3O_2$ Li $(Li_aNi_xMn_yCo_z)O_2$. For simplicity the term metal oxide will be used in the following for these mentioned phosphates/oxides.

The metal oxide shall be coated on the copper foil, in order for such a coating process shall be successful and give a homogeneous surface, the metal oxide A must be mixed 1 with a binder B, for instance PVDF and the metal oxide must in addition be given a viscosity suitable for coating therefore the mixture is added an organic carbonate such as ethylene carbonate (EC) C or diethyl carbonate. This mixing step corresponds to the homogenization step 1 according to the general process description.

Figure 1:
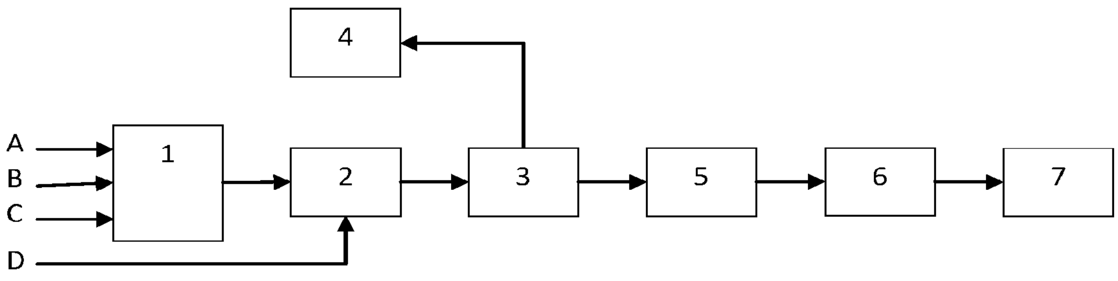

The following steps for cathode and anode will roughly follow the same process as described in FIG. 1.

It shall be understood that a number of binders and active raw materials can be combined, where the central issue is that the thinner shall be a component in the final battery.

In the following is a description of the electrolyte and the properties associated with the materials composing the parts of the electrolyte. The electrolyte in a normal battery normally consists of organic carbonates such as EC (ethylene carbonate), diethyl carbonate. EC which is the most common is a waxy material which melts at approximately 40° C. and is then a liquid with low viscosity. EC is not poisonous; it is without smell and is only flammable at higher temperatures (above 140° C.).

According to an aspect of the invention the desired viscosity of this slurry may be generated by mixing the binder B (such as PVDF), the powder A (active, materials) and molten EC C. The amount of EC is adjusted according to the desired viscosity of the mixture.

This mixture is homogenized 1 vigorously at a temperature above the mclting point of EC and below the melting point of the binder (for example at approx. 180° C. for PVDF). The particles with the binder will then because of the vigorous mixture be dispersed between all the particles in the mixture. If the homogenization takes place at a temperature above the melting temperature of the binder B, the mixture will obtain a lower viscosity.

When the mixture is homogenized sufficiently 1, so that the binder particles B are dispersed evenly between all the particles in the mixture, the metal foil D can be coated with the mixture. This may be done by extrusion, rolling or tape-casting. The battery film will then have to be heated 3 in order to evaporate the EC till the EC concentration is equal to or less than the desired EC concentration of the finished battery cell.

The consequent rolling 5 of the battery film will press the particles together and will improve the binding between the particles.

The EC—vapor which is formed by drying of the battery film can be condensed, filtered and reused in the process. EC is a harmless liquid with few health and environmental impacts.

A: Active materials, such as graffiti and lithium oxide
B: Binder, for example PVDF
C: Thinner according to the available invention, an electrolyte component such as organic carbonates
D: Leading foil, such as aluminum foil, copper foil, aluminum canvas and copper canvas among others
1: Homogenization
2: Coating, for instance by extruding, tape-casting, rolling or similar
3: Evaporation of solvents
4: Recycling of solvents 5: Rolling 6: Baking, to melt the binder 7: Further processing to build up the battery In certain embodiments of the present disclosure, an electrode comprises an active material in which a conductive additive and a binder are homogeneously dispersed. Although the present disclosure focuses primarily on a positive electrode (a cathode), the inventors envisage that certain embodiments may be produced as a negative electrode (an anode).

Figure 2:
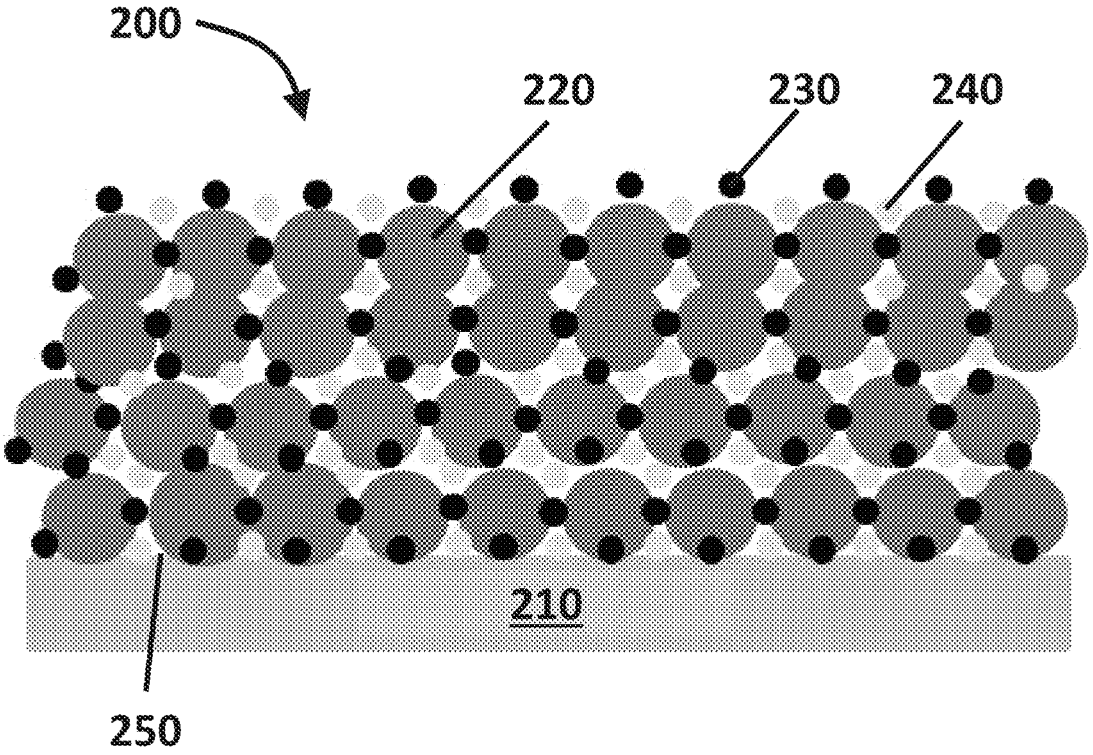
FIG. 2 shows a schematic illustration of the first few layers of an electrode slurry coated onto a current collector according to the present disclosure.

FIG. 2 shows a schematic view showing the first few layers of an electrode slurry coating 200. The illustration is indicative of only part of the electrode as according to the size of the active material particles, the number of layers will typically be greater than as shown in FIG. 2. As can be seen in FIG. 2, the electrode slurry coating 200 has been applied onto at least one lateral surface 250 of a current collector 210. The current collector 210 may be made of a metal foil. For example, the current collector 210 may be made of a metal, such as aluminum, stainless steel, titanium, copper, nickel, an iron-nickel alloy, or another suitable metal. The electrode slurry coating 200 comprises an active material 220, a conductive additive 230, and a binder 240. The active material 220 may be a positive active material. The conductive additive 230 may comprise carbon. The binder 240 may be polyvinylidene fluoride (PVDF). The conductive additive 230 may be substantially uniformly dispersed within the electrode slurry coating 200. Similarly, the binder 240 may be substantially uniformly dispersed within the electrode slurry coating 200. According to the present disclosure, "substantially uniformly dispersed" is intended to refer to the relevant particles being generally spaced apart from each other (i.e., not clumped or agglomerated, or mostly not clumped or agglomerated) but also generally being relatively divided within the volume of the electrode slurry coating 200 (i.e., each relevant particle generally within a certain distance of another relevant particle).

According to the present disclosure, the electrode slurry coating, including the active material, is adhered strongly to the current collector. In coatings that are not adhered strongly, there is often a depletion of binder near the current collector. In embodiments according to the present disclosure, binder remains dispersed and present near to the current collector. In conventional electrodes, the thickness of the electrode is often limited by a few factors, including that if the electrode is too thick, the active material will not adhere to the current collector. According to the present disclosure, the strong adhesion of the active material to the current collector allows for the electrode to be produced as a thicker electrode. The electrode may be produced by extrusion. The electrode may be extruded to be thick or thin. According to certain aspects of the present disclosure, the positive electrode may have a thickness of between 10 and 500 microns, or between 40 and 300 microns, or approximately 200 microns. The positive electrode may comprise a current collector having at least one lateral surface that has been coated with an electrode slurry. Thicker electrodes produced according to the present disclosure may have a coating on the at least one lateral surface of the electrode having a thickness of between 50 and 500 microns. The current collector may comprise a second lateral surface, wherein the second lateral surface may be coated with the electrode slurry. The coating on the second lateral surface of the positive electrode may have a thickness of between 50 and 500 microns, such that the combined thickness of the coatings on the at least one and the second lateral surfaces is between 100 and 1000 microns. In certain embodiments, the combined thickness of the coatings on the at least one and the second lateral surfaces may be between 200 and 600 microns, or approximately 300 microns.

FIGS. 3A, 3B, 3C, 3D, and 3E show SEM images. The images shown in FIGS. 3A and 3C were taken using secondary electrons. The images shown in FIGS. 3B, 3D, and 3E were taken using back-scattered electrons.

FIGS. 3A and 3B show SEM images of a top surface of a cathode according to an embodiment of the present disclosure. As can be seen, carbon particles are relatively uniformly dispersed in the active material. The active material particles have an average particle size of about 4-5 μm. In FIGS. 3A and 3B, one does not see carbon agglomeration along the structure. Rather, one can see carbon black uniformly covering the cathode particles, which will foster a better conductive network with reduced polarization due to decreased internal resistance as compared to cathodes produced by a typical NMP process.

In contrast, FIGS. 3C and 3D show SEM images of a top surface of a cathode produced by a typical NMP process. The difference in morphology and microstructure is evident when comparing FIGS. 3A and 3B to 3C and 3D. The agglomerated formation of larger particles with an average particle size of about 10 μm in the typical NMP process is also evident. There is relatively large local accumulation of carbon between active particles, indicating the formation of heavy agglomeration of carbon black. Further, the surface of the particles in FIGS. 3C and 3D is smoother in appearance and shows particles with sharper grain boundaries than the surface of the particles visible in FIGS. 3A and 3B.

FIG. 3E shows an SEM image of a top surface of an NMC electrode produced using NMP (J. Xia et al., J. Electrochem. Soc., 2014, 161 (4), A547-A553). The microstructure shown in FIG. 3E shows agglomerated larger particles, possibly attributed to a non-uniform carbon covering different active material particles, similar to FIGS. 3C and 3D.

FIGS. 4A and 4B show SEM and EDS results of a cathode prepared according to an embodiment of the present disclosure. In particular, the areas marked as 1 and 2 visible in the SEM micrograph of FIG. 4A are shown in the corresponding EDS results in FIG. 4B. These EDS results show the incorporation of carbon conductive additive in manganese, nickel, and cobalt originated from active material particulates. According to an embodiment of the present disclosure, lithium with manganese, nickel, cobalt, aluminum, or a combination thereof may be active materials. The active cathode material may be selected from a group comprising: $LiCoO_2$, $LiFePO_4$, $LiMN_204$, $LiNiO_2$, $Li_2FePO_4F$, $LiCo_{1/3}Ni_1/3Mn_1/30_2$, and $Li(Li_aNi_xMn_yCo_z)$. The difference in carbon and manganese intensity may be negligible and that ratio may be approximately 5:6, especially where the active materials are present—here, visible in the area marked 2. This further confirms the uniform coverage of carbon all around the active particles. The visible presence of fluorine in both dark and grey regions, suggests relatively uniform PVDF binder distribution. The uniform distribution of carbon and PVDF binder results in improved electronic conductivity.

FIGS. 4C and 4D show SEM and EDS results of a cathode produced by a typical NMP process. The difference in carbon distribution in this NMP cathode as compared to a cathode prepared according to the present disclosure is evident when comparing FIGS. 4A and 4B to FIGS. 4C and 4D. The relative intensity of the carbon signal is significantly lower than that of the manganese signal where the active particles reside (area marked 2). Similarly, the signals related to the active materials (here, manganese, nickel, and cobalt) are smaller as compared to the carbon signals in dark regions where carbon is mostly concentrated. The presence of concentrated carbon suggests a non-uniform carbon distribution. Further, the small amount of fluorine observed in some areas, particularly the dark regions where there is a significant presence of carbon, suggests that the PVDF binder is mostly concentrated near carbon, and less concentrated on the active material particles.

FIGS. 5A through 5L show SEM micrographs and X-ray elemental maps for an electrode from the top surface of an embodiment generated by energy dispersive spectroscopy (EDS). FIGS. 5A and 5G each show a SEM micrograph. The elemental maps are taken from the same area as the SEM micrographs and show fluorine (5B and 5H), carbon (5C and 5I), manganese (5D and 5J), nickel (5E and 5K), and oxygen (5F and 5L) elemental maps, respectively. The elements detected come primarily from PVDF, carbon black, and active materials, respectively.

FIGS. 5A, 5B, 5C, 5D, 5E, and 5F each come from a cathode according to an embodiment of the present disclosure. The elemental maps of 5B and 5C show almost uniform distributions of fluorine and carbon over the positive electrode surface, indicating that all electrode constituents are covered by the binder and conductive additive. The microstructure in this embodiment provides better conductive additive dispersion, which enhances the electronic conductivity and forms a conductive path or carbon black network.

FIGS. 5G, 5H, 5I, 5J, 5K, and 5L show SEM results of cathodes produced by a typical NMP process. In contrast, as shown in FIG. 51, they exhibit poor carbon distribution and particle agglomeration in areas where no active material is present. This results in reduced electronic conductivity as compared to a cathode prepared according to the present disclosure.

FIGS. 6A and 6B show TOF-SIMS (Time of Flight Secondary Ion Mass Spectrometry) signals of F- and C- of a cathode according to the present disclosure.

FIGS. 6C and 6D show TOF-SIMS signals of F- and C- of a typical cathode produced using NMP. FIGS. 6E and 6F show TOF-SIMS signals of F- and C- of a typical supplier cathode. FIGS. 6G and 6H show TOF-SIMS signals of F- and C- of a typical supplier anode. According to the present disclosure, a typical supplier electrode is a commercially-available solvent-based electrode.

FIGS. 6A and 6B show the in-depth distribution of fluoride (F-) and carbon (C-) signals for a cathode according to the present disclosure. FIGS. 6C and 6D show the in-depth distribution of fluoride and carbon signals for a cathode produced by typical NMP process. In FIGS. 6A and 6B, one can observe only a relatively small variance in fluoride signals through the entire thickness for a cathode according to the present disclosure. The average particle size for PVDF binder particles in a cathode according to the present disclosure is about 250 nm. As shown in FIGS. 5C and 5D, the variance in fluoride signals is more significant for a cathode produced according to a typical NMP process. The PVDF binder particle size is around 550 nm for a cathode produced according to a typical NMP process, and around 750 nm for a typical supplier cathode (as shown in FIGS. 5E and 5F). The uniformity of the binder distribution in an electrode may be measured by measuring the relative intensity of fluoride signal (e.g., as measured using TOF-SIMS).

Electrodes produced according to the present disclosure have binder (e.g., PVDF) uniformly distributed throughout the thickness of the electrode. As such, the fluoride signal intensity of electrodes produced according to the present disclosure may vary by less than 20%, or less than 15%, throughout the thickness of the electrode. In contrast, a cathode produced by typical NMP process may have a relative intensity of fluoride signal that varies by 50% or more through the thickness of such a cathode.

As shown in FIGS. 6C and 6E, a typical NMP cathode and a typical supplier cathode show more significant fluorine depletion associated with areas without any binder (which may be as large as 15 μm). In each of FIGS. 6A though 6H, there is some evidence of binder agglomeration, as shown by the presence of larger (micron scale) particles.

However, the binder agglomeration observed in FIGS. 6A and 6B is lower than is observed in FIGS. 6C through 6H, as evidenced by the smaller peak width along the whole thickness and the narrower binder particle size distribution along the thickness in FIGS. 6A and 6B. The binder particle size is from 150 to 450 nm for the present disclosure (FIGS. 6A and 6B), 400 nm to 1000 nm or more (micron scale) for the typical NMP cathode (FIGS. 6C and 6D), and 600 nm to 1000 nm or more (micron scale) for the typical supplier electrodes (FIGS. 6E, 6F, 6G, and 6H). The narrower binder particle size distribution is a unique feature especially within a thick and homogeneous electrode.

Particle size distribution increases, and uniformity of dispersion decreases as one moves from cathodes according to the present disclosure, to typical supplier cathodes, to typical NMP cathodes. These characteristics suggest a more uniform and homogeneous binder distribution through the thickness of a cathode prepared according to the present disclosure despite the relatively high thickness of the cathode.

FIGS. 6E and 6F show negative fluoride and negative carbon signals that are weaker near the current collector for a typical supplier cathode. Since the function of the binder is to glue the powder particles together and then glue them firmly to the current collector, the weaker signals could suggest a weaker adhesion of the active material to the current collector in some regions. A more uniform binder distribution means that the electrode particles will be closer together. This decreases interfacial impedance and increases electric contact between active material particles. Contact is important because disconnection often leads to degradation of the electrode.

FIG. 6B shows a uniform carbon ion signal along the thickness of the electrode and an average particle size of about 400 nm. The distribution in FIG. 6B is more even than that of FIGS. 6D, 6F, and 6H. In FIG. 6H, there is no negative carbon ion signal in some areas as large as 20 μm, suggesting that carbon is less homogeneously distributed along the thickness. This type of heterogeneous particulate distribution can cause battery deterioration, retard production speed, and negatively impact yield and battery safety.

FIG. 7A shows a high-angle annular dark-field scanning transmission electron microscope (HAADF-STEM) micrograph of a cathode prepared according to the present disclosure. FIG. 7B shows a point analysis EDS of a cathode prepared according to the present disclosure, taken from areas 1 and 2 identified in FIG. 7A.

FIG. 7C shows a HAADF-STEM micrograph of a typical cathode produced using a NMP process. FIG. 7D show a point analysis EDS of a typical cathode produced using a NMP process, taken from areas 1 and 2 identified in FIG. 7C. Area 1 of FIGS. 7A and 7B appears as a gray particle in FIG. 7A, and is a single crystal of active material covered with carbon. Dark areas consist of carbon and trace amounts of aluminum and copper due to the sample holder and TEM grid respectively. Consistent with the SEM results, no carbon was found on the surface of the particles of active materials (see FIGS. 7C and 7D, area 1).

FIG. 8A shows a voltage profile for the first 10 cycles of a cathode prepared according to the present disclosure. FIG. 8B shows a cycle life of a cathode according to the present disclosure coupled with a graphite anode in a full cell. A cathode according to the present disclosure underwent galvanostatic discharge and charge cycling with a graphite anode in a full cell tested between 3 and 4.1 versus Li/Li+. FIG. 8A shows the voltage profile of the electrode for the first 10 cycles. The cell shows the first charge capacity of 36 Ampere hours, after which the capacity drops to about 33 Ampere hours, indicating the first capacity loss of 8%. FIG. 8B shows the cycling capacity retention performance, tested at 1C-rate. The cell shows an excellent combination of the total capacity and capacity retention on par with or better than other commercial lithium ion battery cells. The cells show a reversible capacity of about 33 Ampere hours with a coulombic efficiency of about 100% after the first cycle and with about 90% capacity retention after 1700 cycles with respect to the second cycle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A positive electrode for a battery, comprising:

a current collector having a first surface and a second surface, wherein the first surface comprises a first coating and the second surface comprises a second coating, wherein the first coating comprises a positive active material; a plurality of conductive additive particles having an average separation distance of 500 nm or less between adjacent particles, wherein the conductive additive particles comprise carbon; and a plurality of polyvinylidene fluoride (PVDF) binder particles, wherein the second coating comprises the positive active material; a second plurality of conductive additive particles having an average separation distance of 500 nm or less between adjacent particles, wherein the conductive additive particles comprise carbon; and a second plurality of polyvinylidene fluoride (PVDF) binder particles, wherein a combined thickness of the current collector, the first coating, and the second coating is between 625 microns and 1000 microns.

2. The positive electrode of claim 1, wherein a combined thickness of the first coating and the second coating is between 200 microns and 600 microns.

3. The positive electrode of claim 2, wherein the combined thickness of the first coating and the second coating is between 300 microns and 550 microns.

4. The positive electrode of claim 1, wherein the plurality of PVDF binder particles comprise 1 to 10 percent by weight of the positive electrode.

5. The positive electrode of claim 1, wherein the plurality of conductive additive particles comprise 1 to 10 percent by weight of the positive electrode.

6. The positive electrode of claim 5, wherein the plurality of conductive additive particles comprise 3 to 5 percent by weight of the positive electrode.

7. The positive electrode of claim 1, wherein an average particle size of the plurality of PVDF binder particles is between 150 nm and 450 nm.

8. The positive electrode of claim 7, wherein the average particle size of the plurality of PVDF binder particles is between 200 nm and 300 nm.

9. The positive electrode of claim 1, wherein the plurality of conductive additive particles has an average separation distance of 300 nm or less between adjacent conductive additive particles.

10. The positive electrode of claim 1, wherein the plurality of PVDF binder particles has an average separation distance of 500 nm or less between adjacent PVDF binder particles.

11. The positive electrode of claim 1, wherein the positive active material comprises lithium, manganese, nickel, cobalt, aluminum, or a combination thereof.

12. The positive electrode of claim 1, wherein the conductive additive is selected from the group consisting of carbon black, acetylene black, and graphite, or combinations thereof.

13. The positive electrode of claim 1, wherein the positive active material is adhered strongly to the current collector.

14. A battery electrode, comprising:

a current collector having a first surface and a second surface, wherein the first surface comprises a first coating and the second surface comprises a second coating, wherein the first coating and the second coating each comprise:

an electrode material, conductive additive particles having an average separation distance of 500 nm or less between adjacent conductive additive particles, and polyvinylidene fluoride (PVDF) binder particles having an average separation distance of 500 nm or less between adjacent PVDF binder particles, wherein a combined thickness of the current collector, the first coating and the second coating is between 625 microns and 1000 microns, and wherein the conductive additive particles comprise carbon black, acetylene black, graphite, or a combination thereof.

15. The battery electrode of claim 14, wherein the PVDF binder particles have an average particle size between 150 nm and 450 nm.

* * * * *